United States Patent
Moon et al.

(10) Patent No.: US 9,595,741 B2
(45) Date of Patent: Mar. 14, 2017

(54) BATTERY PACK OF NOVEL STRUCTURE

(71) Applicant: LG CHEM, LTD., Seoul (KR)

(72) Inventors: Jung Oh Moon, Seoul (KR); Jung Hwan Kim, Cheongju-si (KR); Won Jeon Jeong, Cheongwon-gun (KR); In Ho Nam, Cheongwon-gun (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/344,984

(22) PCT Filed: Oct. 17, 2012

(86) PCT No.: PCT/KR2012/008453
§ 371 (c)(1),
(2) Date: Mar. 14, 2014

(87) PCT Pub. No.: WO2013/065971
PCT Pub. Date: May 10, 2013

(65) Prior Publication Data
US 2015/0249277 A1    Sep. 3, 2015

(30) Foreign Application Priority Data
Oct. 31, 2011   (KR) .................. 10-2011-0112057

(51) Int. Cl.
*H02J 7/00*     (2006.01)
*H01M 10/46*    (2006.01)
(Continued)

(52) U.S. Cl.
CPC ............. *H01M 10/46* (2013.01); *H01M 2/34* (2013.01); *H01M 2/345* (2013.01);
(Continued)

(58) Field of Classification Search
CPC ........ H02J 7/0042; H02J 7/025; H02J 7/0029; H01M 10/052; H01M 10/425;
(Continued)

(56) References Cited

U.S. PATENT DOCUMENTS 9,070,911 B2 *   6/2015  Jeong ................ H01M 2/30
2006/0108979 A1 * 5/2006  Daniel et al. ............. 320/112
(Continued)

FOREIGN PATENT DOCUMENTS

JP    2008-66140 A    3/2008
KR    10-0821885 B1   4/2008
(Continued)

OTHER PUBLICATIONS

International Search Report issued in PCT/KR2012/008453, mailed on Feb. 27, 2013.

*Primary Examiner* — Nathaniel Pelton
(74) *Attorney, Agent, or Firm* — Birch, Stewart, Kolasch & Birch, LLP

(57) ABSTRACT

Disclosed herein is a battery pack including a battery cell having a first electrode terminal and a second electrode terminal, a protection circuit module (PCM) including a protection circuit board (PCB), at which a safety element is mounted, the PCB having a protection circuit, and connection members (A and B) connected respectively to the first and second electrode terminals of the battery cell, an electrically insulative pack frame configured to have a structure in which the battery cell is mounted in the pack frame, the pack frame having an insulative mounting part, at a top of which the PCB is mounted, an electrically insulative top cap mounted at a top of the battery cell while surrounding the PCM, an electromagnetic induction type charging coil mounted at at least one main surface of the battery cell, the charging coil being connected to the PCM, and a shielding
(Continued)

member interposed between the battery cell and the charging coil.

13 Claims, 4 Drawing Sheets

(51) Int. Cl.
  *H01M 10/052* (2010.01)
  *H01M 10/42* (2006.01)
  *H01M 2/34* (2006.01)
  *H02J 7/02* (2016.01)
(52) U.S. Cl.
  CPC ....... *H01M 10/052* (2013.01); *H01M 10/425* (2013.01); *H01M 10/4257* (2013.01); *H02J 7/0029* (2013.01); *H02J 7/0042* (2013.01); *H02J 7/025* (2013.01); *H01M 2010/4271* (2013.01); *H01M 2200/106* (2013.01); *Y02P 70/54* (2015.11); *Y02T 10/7011* (2013.01); *Y10T 29/4902* (2015.01)
(58) Field of Classification Search
  CPC ............ H01M 10/4257; H01M 10/46; H01M 2200/106; H01M 2/34; H01M 2/345
  USPC ................................ 320/107, 108, 112, 113
  See application file for complete search history.

(56) References Cited

U.S. PATENT DOCUMENTS

| | | | |
|---|---|---|---|
| 2008/0061733 A1 | 3/2008 | Toya | |
| 2008/0061735 A1* | 3/2008 | Toya et al. | 320/108 |
| 2008/0292955 A1* | 11/2008 | Byun | H01M 2/0207 429/163 |
| 2011/0140653 A1 | 6/2011 | Jung et al. | |
| 2011/0217571 A1* | 9/2011 | Kim | C23F 3/06 429/7 |
| 2011/0244276 A1* | 10/2011 | Takeshita | H01M 2/0217 429/7 |
| 2011/0250475 A1* | 10/2011 | Yamamoto | H01M 2/0277 429/7 |
| 2011/0262778 A1* | 10/2011 | Yoon | H01M 2/0404 429/7 |
| 2011/0273807 A1* | 11/2011 | Kim | H01M 2/30 361/93.8 |
| 2011/0281141 A1* | 11/2011 | Baek | H01M 2/0207 429/7 |
| 2012/0034494 A1* | 2/2012 | Lee | H01M 2/30 429/7 |
| 2012/0040209 A1* | 2/2012 | Baek | H01M 2/0285 429/7 |
| 2012/0070697 A1* | 3/2012 | Baek | H01M 2/0473 429/7 |
| 2012/0121936 A1* | 5/2012 | Baek | H01M 10/42 429/7 |
| 2012/0121942 A1* | 5/2012 | Kim | H01M 2/0426 429/7 |

FOREIGN PATENT DOCUMENTS

| | | |
|---|---|---|
| KR | 10-2009-0064026 A | 6/2009 |
| KR | 10-2010-0097555 A | 9/2010 |
| WO | WO 2006/104331 A1 | 10/2006 |
| WO | WO 2008/050917 A1 | 5/2008 |
| WO | WO/2010/098571 * | 9/2010 |
| WO | WO 2010/129369 A2 | 11/2010 |

* cited by examiner

BATTERY PACK OF NOVEL STRUCTURE

TECHNICAL FIELD

The present invention relates to a wireless charging type battery pack, and, more particularly, to a battery pack including a battery cell having a first electrode terminal and a second electrode terminal, a protection circuit module (PCM) including a protection circuit board (PCB), at which a safety element is mounted, the PCB having a protection circuit, and connection members connected respectively to the first and second electrode terminals of the battery cell, an electrically insulative pack frame configured to have a structure in which the battery cell is mounted in the pack frame, the pack frame having an insulative mounting part, at a top of which the PCB is mounted, an electrically insulative top cap mounted at a top of the battery cell while surrounding the PCM, an electromagnetic induction type charging coil mounted at at least one main surface of the battery cell, the charging coil being connected to the PCM, and a shielding member interposed between the battery cell and the charging coil.

BACKGROUND ART

As mobile devices have been increasingly developed and the demand for such mobile devices has increased, the demand for secondary batteries as an energy source has also sharply increased.

Depending upon kinds of external devices in which such secondary batteries are used, the secondary batteries may be used in the form of a single battery or in the form of a battery pack having a plurality of unit cells electrically connected to each other. For example, small-sized devices, such as a mobile phone, can be operated for a predetermined period of time with the output and capacity of one battery. On the other hand, a battery pack needs to be used in middle or large-sized devices, such as a laptop computer, a portable digital versatile disc (DVD) player, a small-sized personal computer (PC), an electric vehicle, and a hybrid electric vehicle, because high output and large capacity are necessary for such middle or large-sized devices.

Among secondary batteries, a lithium secondary battery is widely used since the lithium secondary battery has high output and large capacity.

However, various kinds of combustible materials are contained in the lithium secondary battery. As a result, the lithium secondary battery may be heated or explode due to overcharge of the lithium secondary battery, overcurrent in the lithium secondary battery, or other external physical impact applied to the lithium secondary battery. That is, the safety of the lithium secondary battery is very low. Consequently, safety elements, such as a positive temperature coefficient (PTC) element and a protection circuit module (PCM), to effectively control an abnormal state of the lithium secondary battery, such as overcharge of the lithium secondary battery or overcurrent in the lithium secondary battery, are loaded on a battery cell in a state in which the safety elements are connected to the battery cell.

Generally, the PCM is electrically connected to the battery cell via conductive nickel plates by welding or soldering. That is, nickel plates are connected to electrode tabs of the PCM by welding or soldering, and the nickel plates are connected to electrode terminals of the battery cell by welding or soldering. In this way, the PCM is connected to the battery cell to manufacture a battery pack.

It is required for the safety elements, including the PCM, to be maintained in electrical connection with the electrode terminals of the battery cell and, at the same time, to be electrically isolated from other parts of the battery cell. To this end, a plurality of parts is necessary, which complicates an assembly process of the battery pack. In addition, a space necessary to receive the battery cell is reduced.

Consequently, there is a high necessity for a battery pack, a structure of which is optimized such that the number of members mounted at the top of a battery cell is reduced even in a state in which a conventional battery cell is used and a conventional assembly method is maximally utilized, whereby stable coupling among the members mounted at the top of the battery cell is achieved and, in addition, the capacity of the battery cell is increased.

Meanwhile, there is an increasing necessity for a wireless charging type battery pack that is capable of solving problems or defects of a wired charging type battery pack. In such a wireless charging type battery pack, the battery pack is charged through electromagnetic induction based on current/electromagnetic interaction generated between two opposite metal coils.

In order to achieve electromagnetic induction, it is necessary to further install a charging coil at the battery pack. However, installation of the charging coil is very difficult due to a limited space of the battery pack. That is, installation of the charging coil leads to the increase in size of the battery pack. In addition, a process of assembling the battery pack is complicated. Furthermore, the charging coil may interfere with the PCM.

Therefore, there is a high necessity for a battery pack which can be wirelessly charged through electromagnetic induction and can be easily assembled while the increase in size of the battery pack is restrained without occurrence of any interference phenomenon.

DISCLOSURE

Technical Problem

Therefore, the present invention has been made to solve the above problems, and other technical problems that have yet to be resolved.

It is an object of the present invention to provide a wireless charging type battery pack, the structure of which is optimized through integration of a charging element, whereby the capacity of the battery pack is increased while the size of the battery pack is decreased.

Technical Solution

In accordance with one aspect of the present invention, the above and other objects can be accomplished by the provision of a battery pack including a battery cell having a first electrode terminal and a second electrode terminal, a protection circuit module (PCM) including a protection circuit board (PCB), at which a safety element is mounted, the PCB having a protection circuit, and connection members (A and B) connected respectively to the first and second electrode terminals of the battery cell, an electrically insulative pack frame configured to have a structure in which the battery cell is mounted in the pack frame, the pack frame having an insulative mounting part, at a top of which the PCB is mounted, an electrically insulative top cap mounted at a top of the battery cell while surrounding the PCM, an electromagnetic induction type charging coil mounted at at least one main surface of the battery cell, the charging coil being connected to the PCM, and a shielding member interposed between the battery cell and the charging coil.

Consequently, the battery pack according to the present invention has an overall compact structure while the PCM is efficiently mounted through the use of the pack frame, which has a specific shape. In addition, it is possible to charge the battery cell in a noncontact fashion through electromagnetic induction based on the charging coil.

In a preferred example, the battery cell may be configured to have a structure in which an electrode assembly of a cathode/separator/anode structure is provided in a battery case together with an electrolyte in a sealed state and the first electrode terminal and the second electrode terminal are formed at an upper end of the battery case.

The battery case may be a metal container. The battery case requires easy machining and predetermined mechanical strength. For this reason, the battery case may be an aluminum container or a stainless steel container.

In a preferred example, the first electrode terminal may be a cathode terminal and the second electrode terminal may be an anode terminal. For example, a prismatic battery cell may be configured to have a structure in which an electrode terminal protruding from the top of the battery cell and a battery case of the battery cell form an anode terminal and a cathode terminal, respectively, and an insulation member, such as a gasket, is disposed between the anode terminal and the cathode terminal to insulate the anode terminal and the cathode terminal from each other. In the structure of the prismatic battery cell, therefore, the first electrode terminal may be a cathode terminal formed at the top of the battery case and the second electrode terminal may be an anode terminal protruding from the top of the battery case.

The pack frame may be configured to have a structure to surround an outer circumference of the battery cell, which is formed in a plate shape, in a state in which opposite main surfaces of the battery cell are exposed. That is, the increase in thickness of the battery pack is minimized and it is possible to secure a space necessary to install the charging coil and the shielding member since the pack frame surrounds only the edge of the plate-shaped battery cell.

Furthermore, the insulative mounting part, at the top of which the PCB is mounted, may be integrally formed, thereby greatly simplifying the process of assembling the battery pack.

In a preferred example, the top cap may be coupled to the pack frame by engagement between a fastening groove and a fastening protrusion.

Specifically, the top cap may be provided with a downward extension part having at least one fastening groove and the insulative mounting part of the pack frame may be provided at an outside thereof with at least one fastening protrusion corresponding to the fastening groove.

Consequently, the top cap is coupled to the pack frame by engagement between the fastening groove of the top cap and the fastening protrusion of the pack frame, thereby simplifying the process of assembling the battery pack.

The material for the pack frame and/or the top cap is not particularly restricted so long as the pack frame and/or the top cap is made of an insulative material. For example, the pack frame and/or the top cap may be made of a plastic material. Specifically, the pack frame and/or the top cap may be made of a polyolefin resin, such as polypropylene, a polystyrene resin, a polycarbonate resin, an acrylonitrile butadiene styrene (ABS) resin, a rubber resin, or an aramid-based resin, such as Nomax. In a case in which the pack frame and/or the top cap is made of a metal material, the inside of the pack frame and/or the top cap may be coated with an insulative film.

Meanwhile, the end of the charging coil may be coupled to the PCM for connection by welding, such as ultrasonic welding or laser welding, or soldering.

The PCM may be configured to have a structure including a chip formed by integrating the safety element and a charging circuit. Consequently, it is possible to reduce the size of the battery cell. In addition, the inner space of the battery cell is increased due to the reduction of a space necessary to install components, whereby the capacity of the battery is increased.

The safety element may be a positive temperature coefficient (PTC) element. The connection member (B) coupled to the PTC element serves to interrupt electric current at the upper end of the battery pack when the temperature of the battery pack abruptly rises due to an internal short circuit or the like.

The connection member (A) and the connection member (B) are not particularly restricted so long as the connection member (A) and the connection member (B) are formed of a conductive material. Preferably, the connection member (A) and the connection member (B) are each formed of a nickel plate.

The battery pack according to the present invention may be variously applied irrespective of the kind or external shape of the battery cell. Preferably, the battery cell is a prismatic lithium secondary battery cell.

In accordance with another aspect of the present invention, there is provided a method of manufacturing a battery pack including (a) loading a charging coil on one main surface of a shielding member and coupling an end of the charging coil to a connection terminal of a PCM by soldering, (b) coupling a metal clad to a top of a battery cell by spot welding, (c) attaching double-sided adhesive tape to the battery cell, (d) mounting the battery cell in a pack frame, (e) mounting the PCM at a top of an insulative mounting part of the pack frame and coupling connection members of the PCM to electrode terminals of the battery cell by spot welding, (f) mounting a top cap at the battery cell such that the PCM is surrounded by the top cap, and (g) covering an outer surface of the battery cell, together with the pack frame, with a label.

In the battery pack manufactured through the above processes, therefore, it is possible to increase battery capacity of the battery pack having a compact structure and a limited standard through the simple assembly process. In addition, it is possible to charge the battery cell in a noncontact fashion through electromagnetic induction based on the charging coil.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
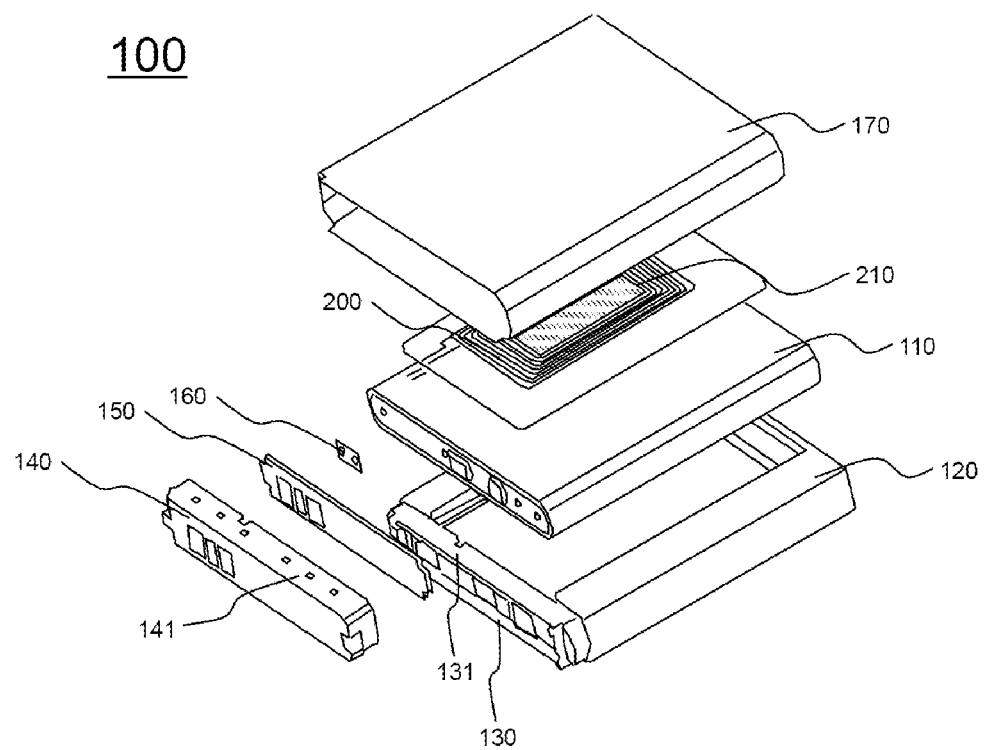
FIG. 1 is an exploded perspective view showing a battery pack according to an embodiment of the present invention.
Figure 2:
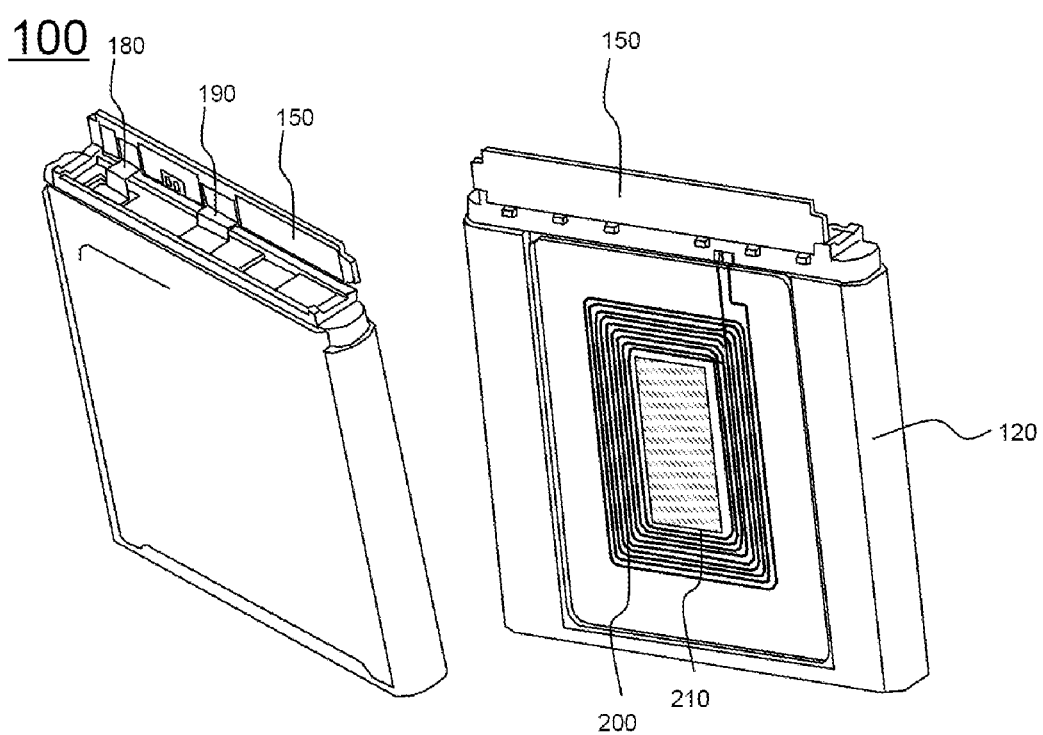
FIG. 2 is a perspective view showing a protection circuit module (PCM) and a pack frame.

FIG. 1 is an exploded perspective view typically showing a battery pack and FIG. 2 is a perspective view typically showing a protection circuit module (PCM) and a pack frame.

Referring to FIGS. 1 and 2, the battery pack 100 is configured to have a structure including a battery cell 110, a PCM 150, and a top cap 140 mounted at the top of the battery cell 110 while surrounding the PCM 150.

The battery cell 110 is configured to have a structure in which an electrode assembly is provided in a battery case together with an electrolyte in a sealed state. The plate-shaped battery cell 110 is mounted in a pack frame 120 such that the pack frame 120 surrounds the outer circumference of the battery cell 110 in a state in which opposite main surfaces of the battery cell 110 are exposed. A metal clad 160 is coupled to the top of the battery cell 110 by spot welding such that the metal clad 160 is electrically connected to the PCM 150.

An insulative mounting part 130 is integrally formed at the top of the pack frame 120. A protection circuit board (PCB) is located at the top of the insulative mounting part 130. The insulative mounting part 130 is provided at the side thereof with a plurality of fastening protrusions 131. The top cap 140 is provided with a downward extension part 145 extending in a direction in which the downward extension part 145 is coupled to the insulative mounting part 130. The downward extension part 145 is provided with a plurality of fastening grooves 141 corresponding in position to the fastening protrusions 131 formed at the insulative mounting part 130.

When the top cap 140 is pushed toward the insulative mounting part 130 in a state in which the top cap 140 is in contact with the insulative mounting part 130 such that top cap 140 faces the insulative mounting part 130, therefore, the top cap 140 is elastically coupled to the insulative mounting part 130. For easy coupling between the top cap 140 and the insulative mounting part 130, the upper end of each of the fastening protrusions 131 is configured to have a downwardly tapered structure.

A charging coil 200 is mounted at one of the exposed main surfaces of the battery cell 110. Between the battery cell 110 and the charging coil 200 is interposed a shielding member 210 to minimize the influence of a magnetic field and to reduce generation of heat caused by eddy current.

A label 170 is formed of a thermally shrinkable material. The label 170 is configured in the shape of a tube, which is disposed at the outer surface of the pack frame 120, including the battery cell 110, to secure electrical isolation from the outside. After the label 170 surrounds the pack frame 120, the label 170 is shrunk by heat applied to the label 170 and comes into tight contact with the outer surface of the pack frame 120, including the charging coil 200 and the shielding member 210.

In addition, connection members 180 and 190 are connected to electrode terminals (not shown) of the battery cell 110 such that the connection members 180 and 190 are electrically connected to the PCM 150.

Figure 3:
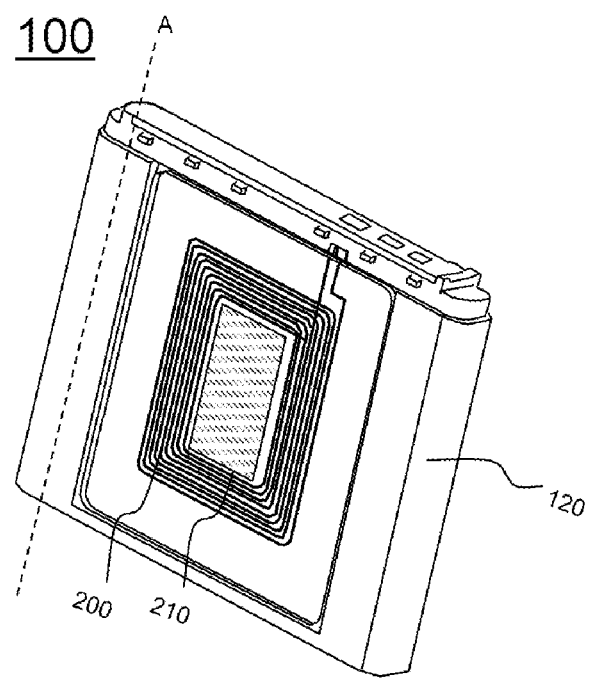
FIG. 3 is a perspective view of the battery pack according to the embodiment of the present invention.
Figure 4:
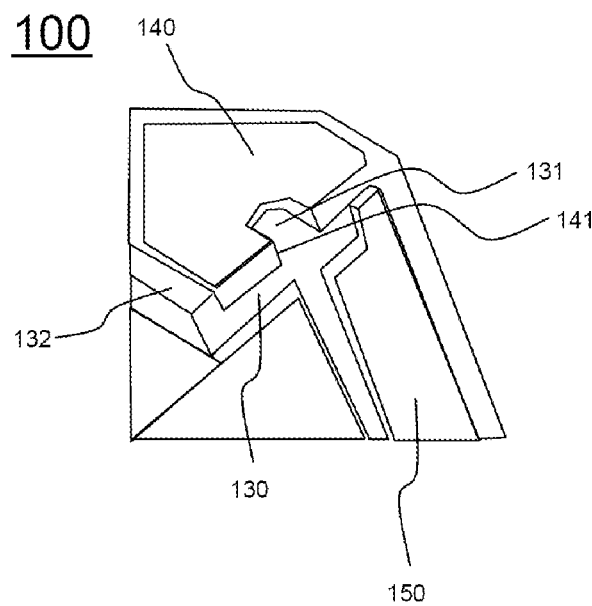
FIG. 4 is a partial sectional view of the battery pack according to the embodiment of the present invention.

FIG. 3 is a perspective view typically showing the battery pack according to the embodiment of the present invention and FIG. 4 is a partial sectional view typically showing the battery pack of FIG. 3.

Referring to these drawings together with FIGS. 1 and 2, the top cap 140 is provided with a downward extension part 145 extending in a direction in which the downward extension part 145 is coupled to the insulative mounting part 130. The downward extension part 145 is provided with a plurality of fastening grooves 141, which is arranged in the longitudinal direction of the downward extension part 145. The insulative mounting part 130 is provided with a plurality of fastening protrusions 131 corresponding in position to the fastening grooves 141 formed at the downward extension part 145.

Specifically, the fastening grooves 141 are formed at the downward extension part 145 of the top cap 140 and the fastening protrusions 131, which are engaged into the fastening grooves 141, are formed at the insulative mounting part 130, which is coupled to the downward extension part 145. When the top cap 140 is pushed toward the insulative mounting part 130 in a state in which the top cap 140 is in contact with the insulative mounting part 130 such that top cap 140 faces the insulative mounting part 130, therefore, the fastening protrusions 131 are elastically engaged into the fastening grooves 141.

As shown in FIG. 4, one side of each fastening protrusion 131 is configured in the form of an arc-shaped taper. Consequently, the fastening protrusions 131 are easily mounted into the respective fastening grooves 141. Furthermore, the fastening protrusions 131 are not easily separated from the respective fastening grooves 141.

In addition, the insulative mounting part 130 is provided at the end thereof with a step part 132 extending in the longitudinal direction. Consequently, the end of the downward extension part 145 of the top cap 140 is fixed in tight contact together with the downwardly tapered fastening protrusions 131 mounted in the fastening grooves 141 of the top cap 140.

Figure 5:
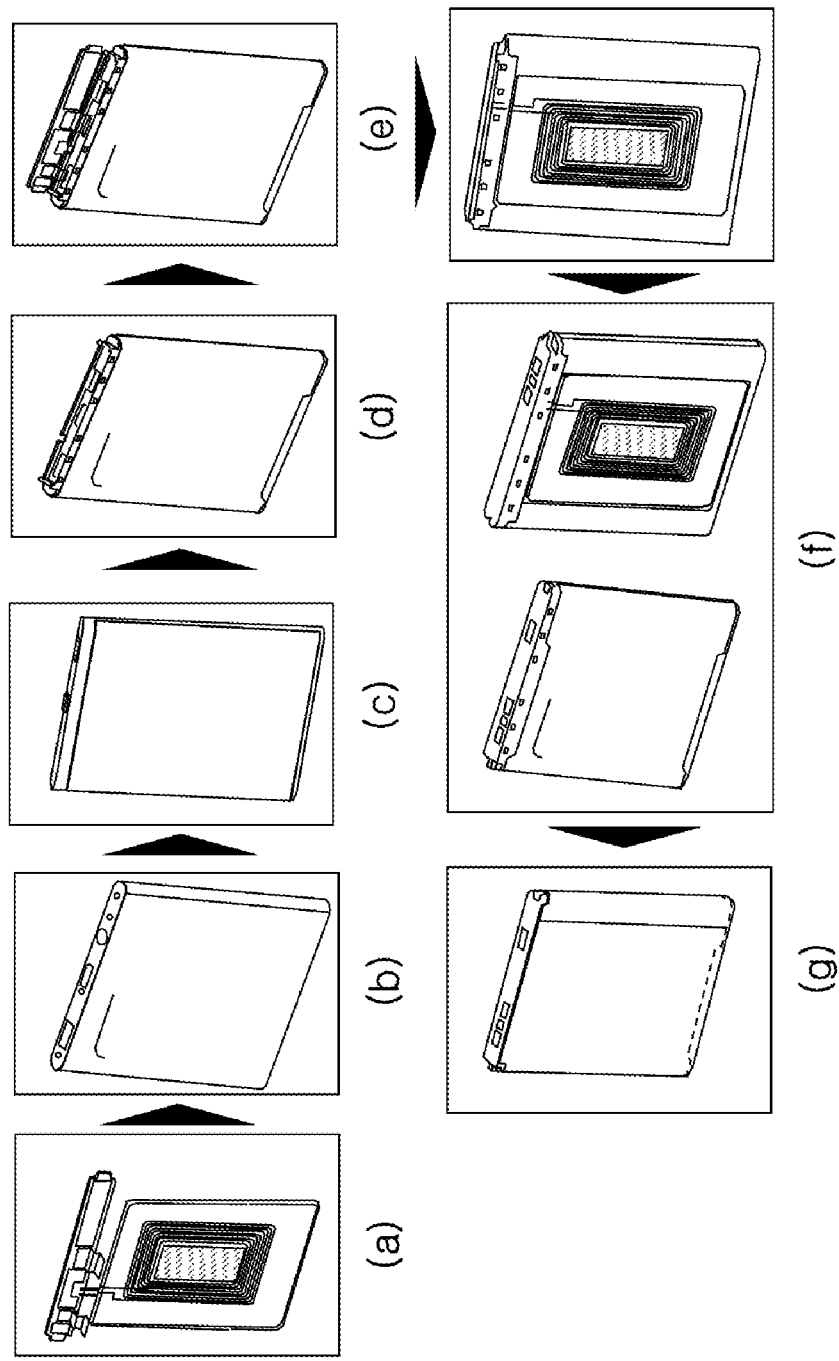
FIG. 5 is a typical view showing a process of assembling the battery pack according to the embodiment of the present invention.

FIG. 5 is a perspective view typically showing a process of assembling the battery pack according to the embodiment of the present invention.

Referring to this drawing together with FIGS. 1 to 4, a shielding member 210 to minimize the influence of a magnetic field is mounted at a battery cell 110 and a charging coil 200 is loaded on one main surface of the shielding member 210. Subsequently, an end of the charging coil 200 is coupled to a connection terminal of a PCM 150 by soldering.

A metal clad 160 is coupled to the top of the battery cell 110 by spot welding and double-sided adhesive tape is attached to the outer circumference of the battery cell 110. Subsequently, the battery cell 110 is mounted in a pack frame 120 such that opposite main surfaces of the battery cell 110 are exposed. The PCM 150 is mounted at the top of an insulative mounting part 130 of the pack frame 120 and connection members 180 and 190 of the PCM 150 are connected to electrode terminals of the battery cell 110 by spot welding.

Finally, a top cap 140 is mounted at the battery cell 110 such that the PCM 150 is surrounded by the top cap 140 and the outer surface of the battery cell 110, including the pack frame 120, is covered by a label 170. As a result, the process of manufacturing the battery pack 100 is completed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the wireless charging type battery pack according to the present invention has effects in that the battery pack has an overall compact structure while a protection circuit module (PCM) is efficiently mounted through the use of a pack frame having a specific shape and that it is possible to charge a battery cell in a noncontact fashion through electromagnetic induction based on a charging coil.

The invention claimed is:

1. A battery pack comprising:
a battery cell having a first electrode terminal and a second electrode terminal;
a protection circuit module (PCM) comprising a protection circuit board (PCB), at which a safety element is mounted, the PCB having a protection circuit, and connection members (A and B) connected respectively to the first and second electrode terminals of the battery cell;
an electrically insulative pack frame configured to have a structure in which the battery cell is mounted in the pack frame, the pack frame having an insulative mounting part, at a top of which the PCB is mounted, the insulative mounting part integrally formed with the pack frame and forming a top wall of the pack frame;
an electrically insulative top cap mounted at a top of the battery cell while surrounding the PCM;
an electromagnetic induction type charging coil mounted at at least one main surface of the battery cell, the charging coil being connected to the PCM; and
a shielding member interposed between the battery cell and the charging coil,
wherein an end of the charging coil is coupled to the PCM by welding or soldering,
wherein an electrode assembly of a cathode/separator/anode structure is provided in a battery case together with an electrolyte in a sealed state,
wherein the first electrode terminal and the second electrode terminal are formed at an upper end of the battery case,
wherein the top cap is coupled to the pack frame by engagement between a fastening groove and a fastening protrusion, and
wherein the top cap is provided with a downward extension part having at least one fastening groove, and the insulative mounting part of the pack frame is provided at an outside thereof with at least one fastening protrusion corresponding to the fastening groove.

2. The battery pack according to claim 1, wherein the battery case is a metal container.

3. The battery pack according to claim 1, wherein the first electrode terminal is a cathode terminal and the second electrode terminal is an anode terminal.

4. The battery pack according to claim 1, wherein the pack frame is configured to have a structure to surround an outer circumference of the battery cell, which is formed in a plate shape, in a state in which opposite main surfaces of the battery cell are exposed.

5. The battery pack according to claim 1, wherein the pack frame and/or the top cap is formed of a plastic material.

6. The battery pack according to claim 1, wherein the PCM comprises a chip formed by integrating the safety element and a charging circuit.

7. The battery pack according to claim 1, wherein the safety element is a positive temperature coefficient (PTC) element.

8. The battery pack according to claim 1, wherein the connection member (A) and the connection member (B) are each formed of a nickel plate.

9. The battery pack according to claim 1, wherein the battery cell is a prismatic lithium secondary battery cell.

10. A method of manufacturing a battery pack according to claim 1 comprising:
(a) loading a charging coil on one main surface of a shielding member and coupling an end of the charging coil to a connection terminal of a PCM by soldering;
(b) coupling a metal clad to a top of a battery cell by spot welding;
(c) attaching double-sided adhesive tape to the battery cell;
(d) mounting the battery cell in a pack frame;
(e) mounting the PCM at a top of an insulative mounting part of the pack frame and coupling connection members of the PCM to electrode terminals of the battery cell by spot welding;
(f) mounting a top cap at the battery cell such that the PCM is surrounded by the top cap, wherein the top cap is coupled to the pack frame by engagement between a fastening groove and a fastening protrusion, and the top cap is provided with a downward extension part having at least one fastening groove, and the insulative mounting part of the pack frame is provided at an outside thereof with at least one fastening protrusion corresponding to the fastening groove; and
(g) covering an outer surface of the battery cell, together with the pack frame, with a label.

11. The battery pack according to claim 1, wherein the PCM is between the insulative mounting part and the electrically insulative top cap.

12. A battery pack comprising:
a battery cell having a first electrode terminal and a second electrode terminal;
a protection circuit module (PCM) comprising a protection circuit board (PCB), at which a safety element is mounted, the PCB having a protection circuit, and connection members (A and B) connected respectively to the first and second electrode terminals of the battery cell;
an electrically insulative pack frame configured to have a structure in which the battery cell is mounted in the pack frame, the pack frame having an insulative mounting part, at a top of which the PCB is mounted, the insulative mounting part being integrally formed with the pack frame and forming a top wall of the pack frame;
an electrically insulative top cap mounted at a top of the battery cell while surrounding the PCM;
an electromagnetic induction type charging coil mounted at at least one main surface of the battery cell, the charging coil being connected to the PCM; and
a shielding member interposed between the battery cell and the charging coil,
wherein the PCM comprises a chip formed by integrating the safety element and a charging circuit,
wherein an electrode assembly of a cathode/separator/anode structure is provided in a battery case together with an electrolyte in a sealed state, wherein the first electrode terminal and the second electrode terminal are formed at an upper end of the battery case, wherein the top cap is coupled to the pack frame by engagement between a fastening groove and a fastening protrusion, and wherein the top cap is provided with a downward extension part having at least one fastening groove, and the insulative mounting part of the pack frame is provided at an outside thereof with at least one fastening protrusion corresponding to the fastening groove.

13. A battery pack comprising:

a battery cell having a first electrode terminal and a second electrode terminal;

a protection circuit module (PCM) comprising a protection circuit board (PCB), at which a safety element is mounted, the PCB having a protection circuit, and connection members (A and B) connected respectively to the first and second electrode terminals of the battery cell;

an electrically insulative pack frame configured to have a structure in which the battery cell is mounted in the pack frame, the pack frame having an insulative mounting part, at a top of which the PCB is mounted, the insulative mounting part being integrally formed with the pack frame and forming a top wall of the pack frame;

an electrically insulative top cap mounted at a top of the battery cell while surrounding the PCM;

an electromagnetic induction type charging coil mounted at at least one main surface of the battery cell, the charging coil being connected to the PCM; and a shielding member interposed between the battery cell and the charging coil, wherein the top cap is coupled to the pack frame by engagement between a fastening groove and a fastening protrusion, and the top cap is provided with a downward extension part having at least one fastening groove, and the insulative mounting part of the pack frame is provided at an outside thereof with at least one fastening protrusion corresponding to the fastening groove, wherein an electrode assembly of a cathode/separator/anode structure is provided in a battery case together with an electrolyte in a sealed state, and wherein the first electrode terminal and the second electrode terminal are formed at an upper end of the battery case.

* * * * *